(12) United States Patent
Hessenauer et al.

(10) Patent No.: US 11,366,446 B2
(45) Date of Patent: Jun. 21, 2022

(54) MODULAR CONTROL OF A LINEAR DRIVE WITH COMMUNICATION

(71) Applicant: Siemens Aktiengesellschaft, Munich (DE)

(72) Inventors: Juergen Hessenauer, Leutershausen (DE); Michael Jaentsch, Erlangen (DE); Carsten Spindler, Remptendorf (DE)

(73) Assignee: Siemens Aktiengesellschaft, Munich (DE)

( * ) Notice: Subject to any disclaimer, the term of this patent is extended or adjusted under 35 U.S.C. 154(b) by 1022 days.

(21) Appl. No.: 14/943,739

(22) Filed: Nov. 17, 2015

(65) Prior Publication Data
US 2016/0139585 A1 May 19, 2016

(30) Foreign Application Priority Data
Nov. 18, 2014 (EP) .................................... 14193670

(51) Int. Cl.
*G05B 19/19* (2006.01)
*H04L 67/104* (2022.01)
*H04L 12/413* (2006.01)

(52) U.S. Cl.
CPC ............ *G05B 19/19* (2013.01); *H04L 12/413* (2013.01); *H04L 67/104* (2013.01); *G05B 2219/41337* (2013.01)

(58) Field of Classification Search
CPC .......... G05B 19/19; G05B 2219/41337; H04L 12/413; H04L 67/104
See application file for complete search history.

(56) References Cited

U.S. PATENT DOCUMENTS

2002/0037007 A1 3/2002 Gross et al.
2009/0119437 A1* 5/2009 Hilscher ............... H04L 12/407
710/305

(Continued)

FOREIGN PATENT DOCUMENTS

CN 103907274 7/2014
CN 103959640 7/2014

(Continued)

OTHER PUBLICATIONS

Office Action dated Nov. 3, 2017 which issued in the corresponding Chinese Patent Application No. 201510792426.X.

*Primary Examiner* — James J Lee
*Assistant Examiner* — Shon G Foley
(74) *Attorney, Agent, or Firm* — Cozen O'Connor (57) ABSTRACT

A plurality of sequentially consecutive sections of a linear drive are each controlled case by a respective control device that is assigned to a respective section of the plurality of sequentially consecutive sections, where converters that are controlled by the respective control device each individually apply current to a subsection of the respective section, and collectively to the respective section, control devices each specify new desired values to the converters they control, the respective control device controls each respective convertor of a plurality of converters, and where the control devices communicate, via respective peer-to-peer interfaces having real-time capability, with a number of other control devices that control sections.

23 Claims, 3 Drawing Sheets

(56) References Cited

U.S. PATENT DOCUMENTS

| | | | |
|---|---|---|---|
| 2010/0185320 A1* | 7/2010 | Nemeth-Csoka | B23Q 5/28 700/230 |
| 2014/0009093 A1* | 1/2014 | Suzuki | H02P 25/22 318/400.02 |
| 2014/0288725 A1* | 9/2014 | Itaya | H02J 3/00 700/298 |
| 2014/0292112 A1 | 10/2014 | Mukai | |
| 2014/0333236 A1 | 11/2014 | Yamanaka et al. | |
| 2016/0194182 A1* | 7/2016 | Frantzheld | B66B 21/12 318/4 |

FOREIGN PATENT DOCUMENTS

| | | |
|---|---|---|
| DE | 102008008602 A1 | 12/2008 |
| DE | 102007031709 A1 | 1/2009 |
| EP | 1193926 A2 | 4/2002 |

* cited by examiner

MODULAR CONTROL OF A LINEAR DRIVE WITH COMMUNICATION

BACKGROUND OF THE INVENTION

1. Field of the Invention

The present invention relates to a control method for a linear drive, where a plurality of sequentially consecutive sections of the linear drive are each controlled by a control device that is assigned to a respective section of the plurality of sequentially consecutive sections, converters that are controlled by the respective control device each individually apply current to a subsection of the respective section, and collectively to the respective section, and where the control devices each specify new desired values to the converters they control.

2. Description of the Related Art

DE 10 2008 008 602 A1 discloses a system in which a converter and the associated converter control is assigned to each section. Here, the control devices assigned to immediately adjacent sections can communicate with each other. In particular, one control device can function as the master and the other control device as the slave in order to transfer a transported element from one section to the next.

The system disclosed in DE 10 2008 008 602 A1 works well and in a flexible manner. However, it is resource-intensive. In particular, a dedicated control device must be provided for each section of the linear drive.

Also disclosed in the prior art is provision of a shared processor unit (motor controller=control device) that can simultaneously calculate the output voltage for a plurality of assigned converters and specify the calculated output voltage to the converters. The control device and the converters controlled by the control device are usually combined to form a multi-axis motor controller. These types of multi-axis motor controllers are able to regulate a plurality of rotatory or linear axes, where each axis is assigned a converter. One example of such a multi-axis controller is the SINAMICS S 120 system marketed by the applicant. In the case of the SINAMICS S 120 system, the number of axes that can be controlled by the multi-axis motor controller is limited, such as six axes.

It is feasible to control the individual sections of linear drives via such multi-axis motor controllers for rotatory drives. However, in this case, the number of independently controllable sections of the linear drive is limited to the same number. If the linear drive is divided into a number of sections that is greater than this number, a plurality of motor controllers are required. In accordance with the conventional systems, communication does not occur between the multi-axis controllers directly, but via a supervisory control device. Such communication is usually considerably slower than direct communication. Depending on the situation in the individual case, this may be acceptable, disadvantageous or simply unacceptable.

SUMMARY OF THE INVENTION

In view of the foregoing, it is an object of the present invention to provide a way by which a linear drive, despite having a large number of sections, can be regulated in a highly dynamic manner both simply and economically.

This and other objects and advantages are achieved in accordance with the invention by a control method for a linear drive in which a respective control device controls each respective convertor of a plurality of converters in each case, and the control devices communicate, via respective peer-to-peer interfaces having real-time capability, with a number of other control devices that control sections.

In many cases, it is sufficient for the respective control device to be connected via its respective peer-to-peer interfaces to those control devices that each control the sections that are immediately adjacent. Here, the number of control devices to which the respective control device is connected is one or two. In particular, in this case, the number is one for both of the control devices disposed at the ends, and two for the other control devices.

In a preferred embodiment, the respective control device and the converters it controls are combined to form a group of proximately disposed modules. A particularly compact structure is thus produced.

The control devices usually specify the desired values to the converters in a current-regulator clock cycle. The control devices also communicate with each other via the peer-to-peer interfaces in a communication clock cycle. The communication clock cycle is preferably identical to the current-regulator clock cycle, or is a whole-number multiple of the current-regulator clock cycle.

The control devices can also communicate with a supervisory control device via a respective further interface. This communication occurs in a control clock cycle, where the control clock cycle is however longer than the communication clock cycle. By virtue of the presently contemplated embodiment, it is particularly possible to achieve significantly better dynamic performance, relative to the control clock cycle. The control clock cycle is in fact significantly longer in most cases. In particular, it usually applies that the quotient of control clock cycle and communication clock cycle is a power of two ($=2^m$), the exponent m having values of 2, 3, 4, 5 or 6. The exponent m may also have an even higher value, such as 8, 9 or 10.

The peer-to-peer interfaces preferably operate based on Ethernet physics. The present embodiment is particularly simple and economical to realize.

The control devices may have a temporary or permanent master-slave relationship with each other. Such a master-slave relationship may be defined by the supervisory control device. However, the control devices preferably have a temporary master-slave relationship with each other based on the communication between the control devices. This applies in particular if the master-slave relationship is between two control devices with control sections that are immediately adjacent to each other. In particular, the present embodiment makes it possible to realize a transfer of a transported element from one section to the adjacent section in a simple and highly dynamic manner.

As previously mentioned, the master-slave relationship may be permanent. However, the master-slave relationship is preferably established only when necessary. Therefore, provision is preferably made for the master-slave relationship to be established when an element, which is transported via the linear drive, is transported from one of the two sections that are immediately adjacent to each other to the other of the two sections that are immediately adjacent to each other. In addition, the master-slave relationship is to be maintained until the transported element has been transported from the one of the two sections that are immediately adjacent to each other to the other of the two sections that are immediately adjacent to each other. The master-slave relationship is then preferably re-terminated as soon as possible. The master-slave relationship is therefore only established for the time period in which the transfer of the transported element from the one section to the other section occurs.

Provision is preferably made for the control device from whose section the transported element is transported into the immediately adjacent section to declare itself as the master of the control device for that section into which the transported element is transported. The other control device is therefore the slave. The presently contemplated embodiment simplifies the transport of the transported element.

The linear drive is preferably used for the purpose of transporting and positioning work carriers.

It is also an object of the invention to provide a non-transitory computer readable medium encoded with a computer program comprising machine code which is executable by a control device for a section of a linear drive, where the execution of the machine code by the control device causes the control device to specify new desired values in each case to converters it controls.

In accordance with the invention, the computer program is structured such that the execution of the machine code by the control device also causes the control device to control a plurality of converters and to communicate with a number of other control devices via a number of peer-to-peer interfaces having real-time capability.

It is also an object of the invention to provide a control device for a section of a linear drive, where the control device is programmed by such a computer program.

The execution of the computer program by the control device preferably also causes the control device to specify the desired values to the converters it controls in a current-regulator clock cycle, and to communicate with the number of other control devices via the peer-to-peer interfaces in a communication clock cycle, where the communication clock cycle is identical to the current-regulator clock cycle or is a whole-number multiple of the current-regulator clock cycle.

If applicable, the execution of the computer program by the control device preferably also causes the control device to communicate with a supervisory control device via a further interface in a control clock cycle, where the control clock cycle is longer than the communication clock cycle, and/or to have a temporary master-slave relationship with one of the other control devices based on the communication with this control device.

In accordance with the invention, the control device is configured such that the control device has a number of peer-to-peer interfaces having real-time capability, and such that the control device is programmed by the computer program in accordance with the invention.

The control device and the converters it controls are preferably combined to form a group of modules disposed in immediate proximity. Moreover, the peer-to-peer interfaces preferably work using Ethernet physics.

It is a further objection of the invention to provide a linear drive having a plurality of sequentially consecutive sections that are each controlled by a respective control device that is assigned to the respective section, where the control devices are configured in the above-described manner, and where converters that are controlled by the respective control device each individually apply current to a subsection of that section of the linear drive which is assigned to the respective control device, and collectively to the respective section.

In accordance with the invention, the linear drive is configured such that the control devices are configured in accordance with the invention, and such that the control devices are each case connected via their peer-to-peer interfaces to a number of control devices that control other sections.

If the computer program is correspondingly structured, the master-slave relationship (in a similar manner to the control method) is preferably established when an element that is transported via the linear drive is transported from one of two sections that are immediately adjacent to each other to the other of the two sections that are immediately adjacent to each other, and maintained until the transported element has been transported from the one section of the two sections that are immediately adjacent to each other to the other section of the two sections that are immediately adjacent to each other.

Furthermore, the control device from whose section the transported element is transported into the immediately adjacent section preferably declares itself as the master of the control device for that section into which the transported element is transported.

The transported element is preferably configured as a work carrier for transporting and positioning workpieces.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages described above in respect of this invention, and the manner in which these are realized, will become clearer and easier to understand in the context of the following description of the exemplary embodiments, these being explained in greater detail with reference to the drawings, in which.

DETAILED DESCRIPTION OF THE EXEMPLARY EMBODIMENTS

Figure 1:
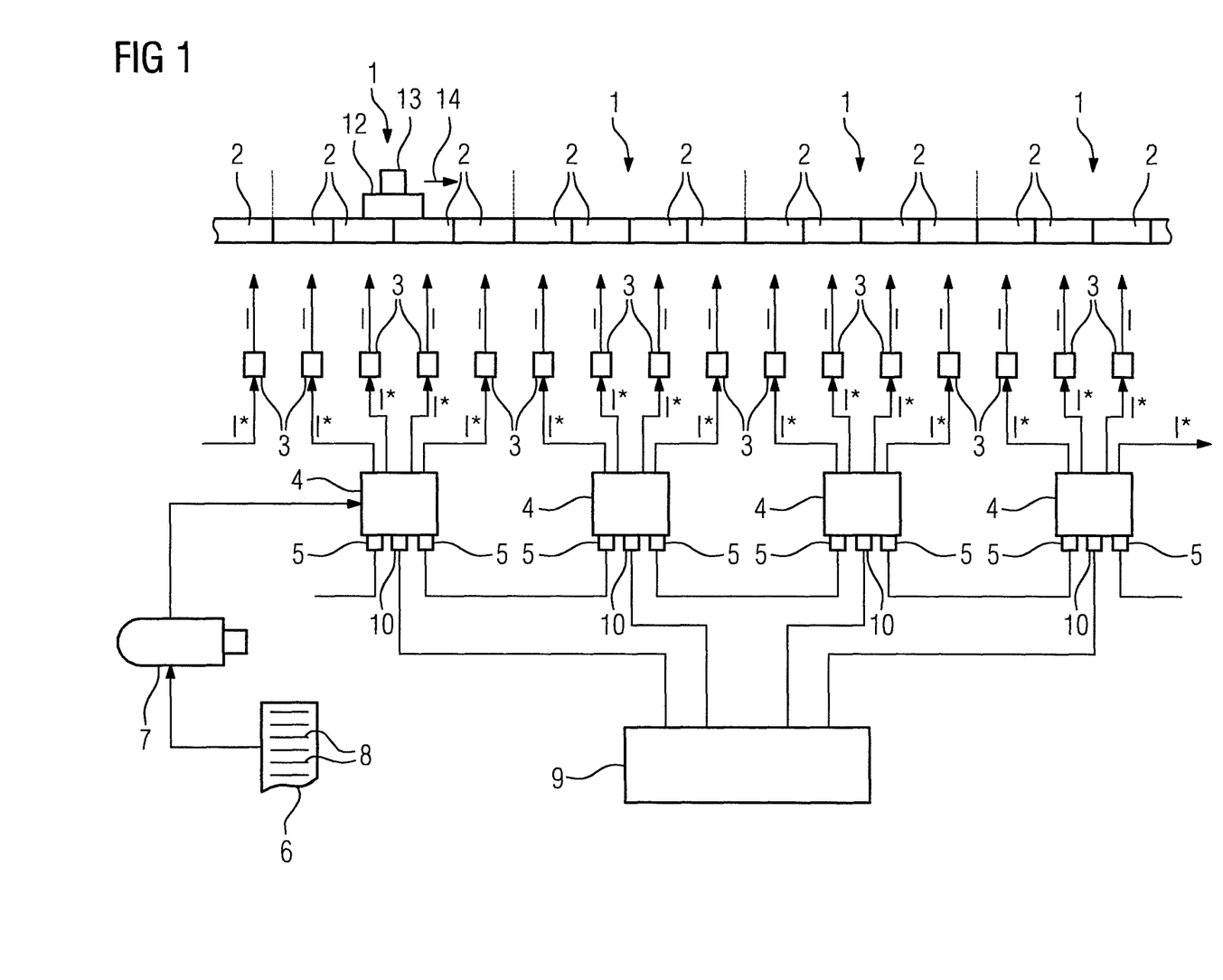
FIG. 1 schematically shows a linear drive in accordance with the invention.

With reference to FIG. 1, a linear drive (i.e., the stationary part of the linear drive or the primary part of the linear drive) has a plurality of sections 1. The sections 1 are sequentially consecutive. Each section 1 has a plurality of subsections 2. Each subsection 2 receives current I from a converter 3. The converters 3 of each section 1 are assigned a respective control device 4. The respective control device 4 controls the converters 3 of the respective section 1 and hence the respective section 1. With continued reference to FIG. 1, each control device 4 controls four converters 3. This illustration is however merely exemplary. Firstly, the control devices 4 may control a larger or smaller number of converters 3. Secondly, the number of controlled converters 3 may vary from control device 4 to control device 4.

Each control device 4 has at least one peer-to-peer interface 5 having real-time capability. Each control device 4 usually has at least two peer-to-peer interfaces having real-time capability 5. The control devices 4 may also have more than two peer-to-peer interfaces having real-time capability 5. Each control device 4 is connected via the peer-to-peer interfaces 5 to a number of control devices 4 that control other sections 1. Each control device 4 is usually connected to the two control devices 4 controlling the section 1 immediately before and the section 1 immediately after the section 1 that is controlled by the respective control device 4. The peer-to-peer interfaces 5 can function based on Ethernet physics as per the illustration in FIG. 2, for example. A possible embodiment of such interfaces is exemplified in US 2002/0037007 A1, for example.

The control devices 4 are programmed by a computer program 6, which is illustrated in FIG. 1 for only one of the control devices 4. The computer program 6 may be supplied to the control devices 4 via a data medium 7, for example. The computer program 6 comprises machine code 8, which can be executed by the respective control device 4. The execution of the machine code 8 causes the respective control device 4 to perform a control method for the linear drive, where the method is explained in greater detail below with reference to FIG. 3.

Figure 3:
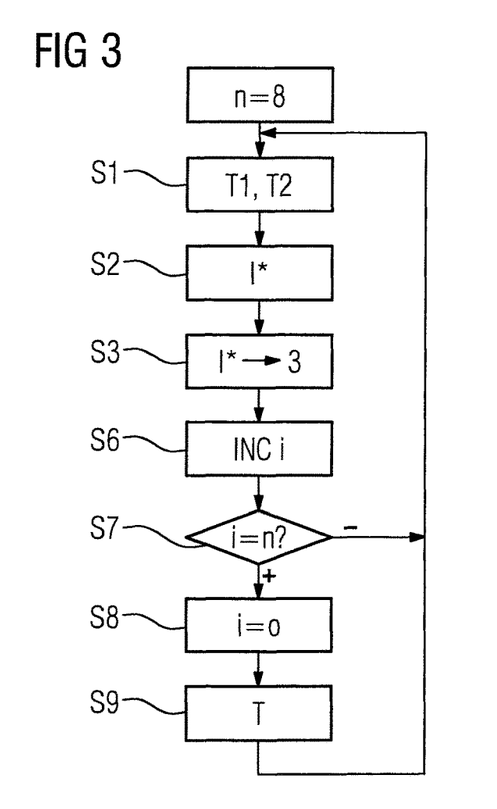
FIG. 3 schematically shows a sequence diagram in accordance with the invention.

The flowchart illustrated in FIG. 3 relates to one of the control devices 4 illustrated in FIG. 1. Similar explanations apply to the other control devices 4.

As shown in FIG. 3, in a step S1, the control device 4 communicates with the two control devices 4 controlling the two adjacent sections 1 via at least one telegram T1, T2 in each case. The telegram T1 concerns the communication to and from the control device 4 for the preceding section 1, and the telegram T2 concerns the communication to and from the control device 4 for the succeeding section 1. If the control device 4 communicates with more than two other control devices 4, telegrams are also exchanged with these control devices 4 in step S1. If the control device 4 communicates with only one other control device 4, the telegram T2 is not required.

In a step S2, the control device 4 determines the respective desired current value I* for the converters 3 it controls, i.e., individually for the respective converter 3. In a step S3, the control device 4 specifies the respective desired current value I* to the respective converter 3 it controls. The respective converter 3 then applies the corresponding current I to the corresponding subsection 2. Consequently, the converters 3 controlled by the respective control device 4 therefore apply current I to the corresponding section 1.

Figure 2:
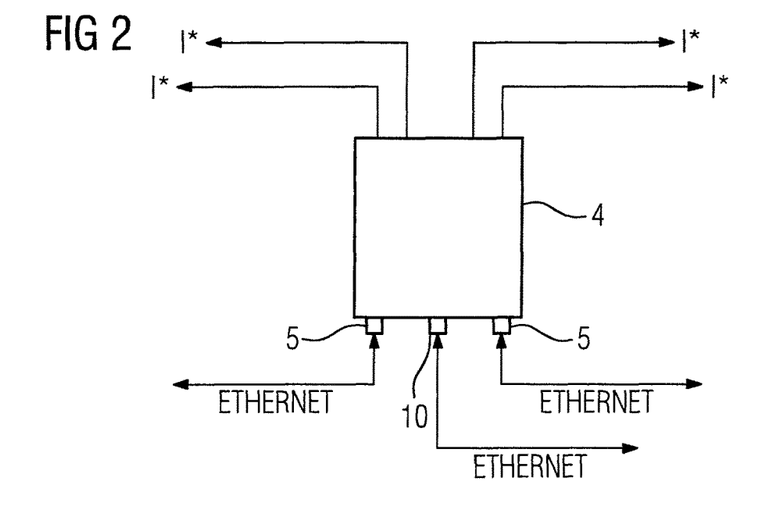
FIG. 2 schematically shows a control device in accordance with the invention.

With reference to the illustration in FIG. 2, the steps S1 to S3 are incorporated in a loop. In particular, the loop is executed by the control device 4 in a current-regulator clock cycle. The current-regulator clock cycle is usually in the range between 31.25 μs and 250 μs. A different current-regulator clock cycle is however possible. With additional reference to FIG. 2, the current-regulator clock cycle includes not only the determination of the desired current values I* and their specification to the converters 3, but also the communication between the control devices 4. From further reference to FIG. 2, a communication clock cycle, in which the communication of the control device 4 is effected via the telegrams T1, T2, is therefore identical to the current-regulator clock cycle. Alternatively, the communication of the control device 4 via the telegrams T1, T2 could also be effected in a communication clock cycle that is a whole-number multiple of the current-regulator clock cycle, e.g., $2^k$ times the length, where k is a relatively low value of 1, 2, 3, 4 or 5, for example.

As illustrated in FIG. 1, a supervisory control device 9 is provided in addition to the control devices 4 in many cases. In this case, the control devices 4 have a respective further interface 10 via which they communicate with the supervisory control device 9. Similarly to the peer-to-peer interfaces 5, the further interface 10 can function based on Ethernet physics.

The communication with the supervisory control device 9 does not occur in the current-regulator clock cycle, or in the communication clock cycle, but in a control clock cycle. The control clock cycle is usually considerably longer than the communication clock cycle, in particular at least twice as long. The control clock cycle may lie in the range between 0.5 ms and 16 ms, for example.

In this case, the loop consisting of the steps S1 to S3 can be supplemented by steps S6 and S7, for example. In the step S6, the control device 4 increments an index i. In the step S7, the control device 4 checks to determine whether the index i has reached a final value n. If index i has not reached a final value n, the control device 4 returns directly to the step S1. Otherwise, the control device 4 returns to the step S1 via steps S8 and S9. In the step S8, the control device 4 resets the index i to the value 0. In the step S9, the communication with the supervisory control device 9 occurs, in particular via corresponding telegrams T.

The final value n is defined by the ratio V of the control clock cycle and the current-regulator clock cycle. If the control clock cycle is eight times as long as the current-regulator clock cycle, for example, the final value n has the value 8 as per the illustration in FIG. 2. In this case, the communication clock cycle is equal to either the current-regulator clock cycle, twice the current-regulator clock cycle, or four times the current-regulator clock cycle, for example. However, the communication clock cycle is not equal to eight times the current-regulator clock cycle or more.

Figure 4:
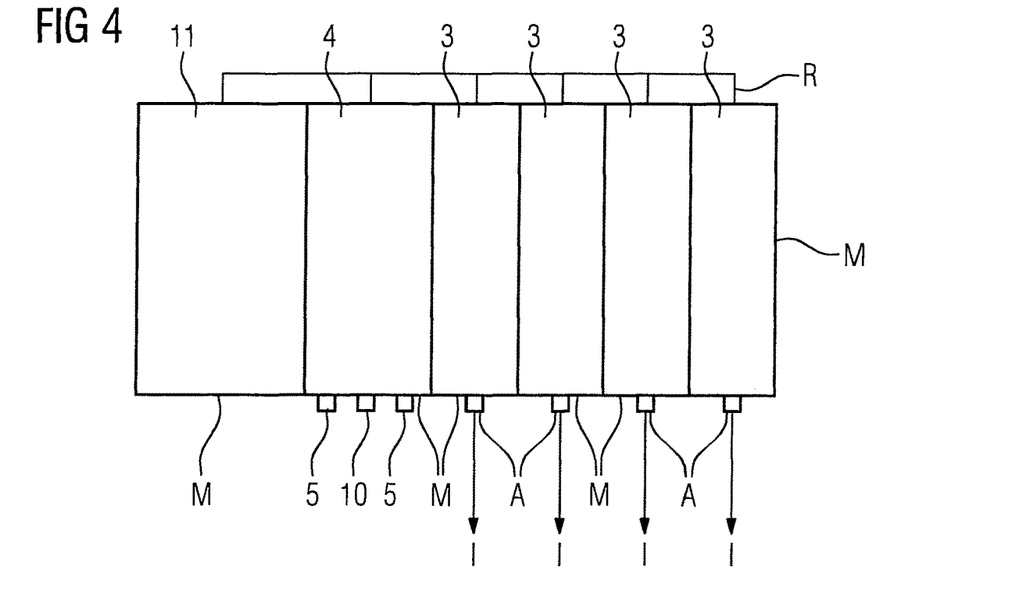
FIG. 4 schematically shows a group of modules in accordance with the invention.

In many cases, the respective control device 4 and the converters 3 it controls are combined to form a group. In addition, provision is often made for a voltage supply device 11, which is likewise part of the respective group. In this case, the voltage supply device 11 converts a voltage supply into an intermediate circuit voltage by means of which the converters 3 are supplied. The control device 4, the converters 3 and (if present) the voltage supply device 11 are often formed as essentially cuboid modules M. The modules M are often disposed in immediate proximity as per the illustration in FIG. 4. The modules M are therefore adjacent to each other. The modules M are usually interconnected via a backplane bus R. The backplane bus R firstly allows the supply of the energy from the voltage supply device 11 to the control device 4 and the converters 3. The backplane bus R secondly allows the communication between the control device 4 and the converters 3. Other embodiments are however possible, such as communication via interfaces disposed on a front side of the modules M. The external connection, i.e., the provision of an incoming supply to the voltage supply device 11, the output of the currents I via the converters 3, and the communication of the control device 4 via the peer-to-peer interfaces 5 and the further interface 10 usually occurs on the front side. The converters 3 often have prefabricated multi-pin terminals A for output of the currents I.

Figure 5:
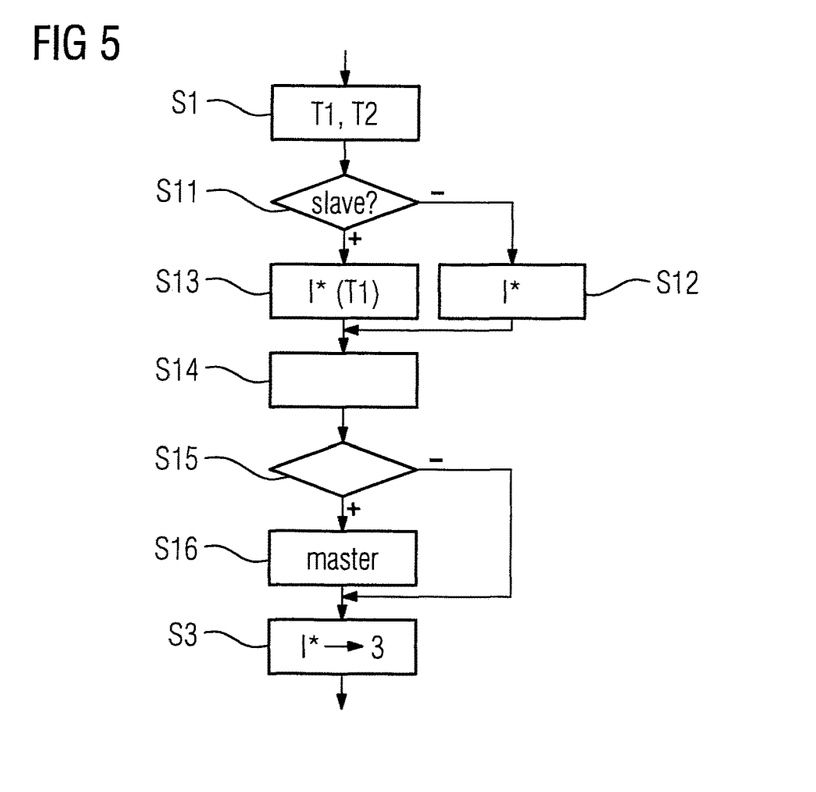
FIG. 5 schematically shows a sequence diagram in accordance with the invention.

The control units 4 are normally able to independently operate the sections 1 they control. This also applies if an element 12 (e.g., a work carrier for transporting and positioning workpieces 13) that is transported and/or positioned via the linear drive is transported from subsection 2 to subsection 2 within a respective section 1. For all of the information required to determine the desired current values I* is available to the respective control device 4 within the respective section 1. However, if the element 12 is transported from the last subsection 2 of a section 1 to the first subsection 2 of the adjacent section 1, the two participating control devices 4 must coordinate the control of the corresponding converters 3 accordingly. A preferred procedure for this purpose is described below with reference to FIG. 5. FIG. 5 is one possible embodiment of the steps S1 to S3 from FIG. 3.

In the context of the explanations relating to FIG. 5, it is assumed that the element 12 is transported from left to right as per the arrow 14 in FIG. 1. Moreover, the operation of the second control device 4 from the left in FIG. 1 is explained. Similar explanations apply to transportation from right to left, and to the other control devices 4. For the sake of brevity, the left-hand section 1 in FIG. 1 and the associated control device 4 are moreover subsequently denoted as preceding section and preceding control device. The reference signs 1a and 4a are used for this section and this control device. Similarly, the second section 1 from the right in FIG. 1 and the associated control device 4 are subsequently referred to as succeeding section and succeeding control device. The reference signs 1c and 4c are used for this section and this control device. The second section 1 from the left and the associated control device 4 are subsequently referred to as middle section and middle control device. The reference signs 1b and 4b are used for this section and this control device.

With reference to FIG. 5, the step S2 from FIG. 3 is replaced by steps S11 to S13. In the step S11, the middle control device 4b checks, with reference to the telegram T1 which it received from the preceding control device 4a, whether it has a master-slave relationship with the preceding control device 4a. If applicable, the middle control device 4b is the slave in this context.

If the middle control device 4b is not a slave of the preceding control device 4a, the middle control device 4b proceeds to the step S12. In the step S12, as in the step S2, the middle control device 4b determines the respective desired current value I* for the converters 3 it controls. However, if the middle control device 4b is a slave of the preceding control device 4a, the middle control device 4b proceeds to the step S13. In the step S13, the middle control device 4b likewise determines the respective desired current value I* for the converters 3 it controls. In contrast with the step S12, in the context of the step S13, the middle control device 4 however takes into consideration parameters of the preceding control device 4a, as transmitted to the middle control device 4b by the control device 4a in the telegram T1. These parameters may comprise phase information in particular. The parameters may contain further information if required.

In a step S14, the middle control device 4b further determines whether and if applicable at which position the element 12 is present. In a step S15, the middle control device 4b checks to determine whether the element 12 is situated in a predefined region of transfer to the succeeding section 1c. It is again noted that, in the context of FIG. 5, the element 12 moves from left to right.

If the element 12 is situated in the region of transfer, i.e., the element 12 is still (at least partially) within the middle section 1b but has advanced at least sufficiently close to or has even partially entered the succeeding section 1c, the middle control device 1b proceeds to a step S16. In the step S16, the middle control device 4b declares itself as the master of the succeeding control device 4c. In particular, in the context of the step S16, the middle control device 4b determines the telegram T2 for the succeeding control device 4c, whereby the succeeding control device 4c knows it is the slave of the middle control device 4b. For example, the middle control device 4b can set a flag in the telegram T2 that is to be sent to the succeeding control device 4c. In the telegram T2 to the succeeding control device 4c, the middle control device 4b also implements the parameters that the succeeding control device 4c should and must take into consideration. For example, the middle control device 4b may insert phase information and possibly further information into the telegram T2. The corresponding telegram T2 is transmitted to the succeeding control device 4c when the step S1 in FIG. 5 is next performed.

As mentioned above, similar explanations apply to transportation from right to left, and to the other control devices 4. As a consequence of the above-explained procedure, the control device 4 from whose section 1 the transported element 12 is transported into the immediately adjacent section 1 declares itself as the master of the control device 4 for that section 1 into which the transported element 12 is transported. As a further consequence, based on the communication between the control devices 4, those control devices 4 that control two sections 1 that are immediately adjacent to each other have a temporary master-slave relationship. In particular, the master-slave relationship is established when an element 12, which is transported via the linear drive, is transported from one section of the two sections 1 that are immediately adjacent to each other to the other section of the two sections 1 that are immediately adjacent to each other. The master-slave relationship is however only maintained for as long as necessary. It is therefore maintained until the transported element 12 has been transported from the one section of the two sections 1 that are immediately adjacent to each other to the other section of the two sections 1 that are immediately adjacent to each other. The master-slave relationship is then re-terminated. As mentioned above, other arrangements are also possible in a master-slave relationship. For example, in some circumstances, a master-slave relationship may permanently exist. A master-slave relationship may also be specified and possibly likewise re-terminated again by the supervisory control device 9. A master-slave relationship may also be terminated again at a subsequent time point, i.e. not as soon as possible.

The present invention is normally used for a "true" linear drive, i.e. for a linear drive having two end sections which are adjacent in each case to a single further section. If the linear drive has more than two sections 1 in total, further sections 1 are also present, and are adjacent to two further sections 1 in each case. However, the present invention can also be used for a "virtual" linear drive. In the case of a "virtual" linear drive, the sections 1 are curved and together form a circle, which in turn forms the stator of a rotatory electric machine. In this case, the transported or positioned element 12 is the rotor of the electric machine. In such cases, it is usual for one of the control devices 4 to be permanently the master of all other control devices 4. The master in this case is usually connected in a star configuration to the other control devices 4, which are all slaves.

In summary, the present invention therefore relates to the following substantive matter:

A plurality of sequentially consecutive sections 1 of a linear drive are controlled in each case by a control device 4 which is assigned to the respective section 1. Converters 3 that are controlled by the respective control device 4 apply current I individually in each case to a subsection 2 of the respective section 1, and collectively to the respective section 1. The control devices 4 specify new desired values I* in each case to the converters 3 they control. The respective control device 4 controls a plurality of converters 3 in each case. The control devices 4 communicate, via respective peer-to-peer interfaces 5 having real-time capability, with a number of other control devices 4 which control sections 1.

The present invention has many advantages. In particular, even a linear drive which extends over a significant length can be realized in a simple and economical manner, while nonetheless allowing highly dynamic control of all sections 1 and/or subsections 2. The control system offers scalability as required. An administrative master controller (=supervisory control device 9) may be present, though this is not required.

Although the invention is illustrated and described in detail with reference to the preferred exemplary embodiment, the invention is not restricted by the examples disclosed here, and other variations may be derived therefrom by a person skilled in the art without thereby departing from the scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control method for a linear drive, comprising:
controlling, by a respective control device which is assigned to a respective section of a plurality of sequentially consecutive sections of the linear drive, the plurality of sequentially consecutive sections;
applying, by a plurality of converters respectively arranged externally at an output of a respective control device and controlled by the respective control device, current individually to a subsection of a plurality of subsections of the respective section via a respective converter of the plurality of converters and collectively to the respective section via the respective converter of the plurality of converters;
specifying, by control devices, new desired values to each of the converters controlled by a respective controller of the convertors;
controlling, by the respective control device, each respective convertor of the plurality of converters; and
communicating, by the control devices, with a number of other control devices that control sections of the plurality of sequentially consecutive sections via respective peer-to-peer interfaces having real-time capability.

2. The control method as claimed in claim 1, wherein the respective control device is connected via its respective peer-to-peer interfaces to those control devices that control sections that are each immediately adjacent.

3. The control method as claimed in claim 1, wherein the respective control device and the plurality of converters controlled by the respective device are combined to form a group of adjacently disposed modules.

4. The control method as claimed in claim 2, wherein the respective control device and the plurality of converters controlled by the respective device are combined to form a group of adjacently disposed modules.

5. The control method as claimed in claim 1, wherein the control devices specify the desired values to the plurality of converters controlled by the control devices in a current-regulator clock cycle;
wherein the control devices communicate with each other via the peer-to-peer interfaces in a communication clock cycle; and
wherein that the communication clock cycle is identical to the current-regulator clock cycle or is a whole-number multiple of the current-regulator clock cycle.

6. The control method as claimed in claim 5, wherein the control devices communicate with a supervisory control device via a respective further interface in a control clock cycle; and
wherein the control clock cycle is longer than the communication clock cycle.

7. The control method as claimed in claim 1, wherein the peer-to-peer interfaces operates based on Ethernet physics.

8. The control method as claimed in claim 1, wherein those control devices which control two sections that are immediately adjacent to each other have a temporary master-slave relationship based on the communication between the control devices.

9. The control method as claimed in claim 8, wherein the master-slave relationship is established when an element, which is transported via the linear drive, is transported from one section of the two sections that are immediately adjacent to each other to another section of the two sections that are immediately adjacent to each other; and
wherein the master-slave relationship is maintained until the transported element has been transported from the one section of the two sections that are immediately adjacent to each other to the other section of the two sections that are immediately adjacent to each other.

10. The control method as claimed in claim 9, wherein the control device from whose section the transported element is transported into the immediately adjacent section declares itself as a master of the control device for that section into which the transported element is transported.

11. The control method as claimed in claim 1, wherein work carriers are transported and positioned via the linear drive.

12. A non-transitory computer readable medium encoded with a computer program comprising machine code which is executable by a control device for a section of a linear drive, each section having a plurality of subsections, execution of the machine code by the control device causing the control device to specify new desired values to each converter controlled by the control device, to control a plurality of converters respectively arranged externally at an output of a respective control device and applying current individually to the plurality of subsections of the respective section and collectively to the respective section, and to communicate with a number of other control devices via a number of peer-to-peer interfaces having real-time capability.

13. The non-transitory computer readable medium as claimed in claim 12, wherein the execution of the machine code by the control device causes the control device to specify the desired values to the converters controls by the control device in a current-regulator clock cycle;
   wherein the control device communicates with a number of other control devices via the peer-to-peer interfaces in a communication clock cycle; and
   wherein the communication clock cycle is identical to a current-regulator clock cycle or is a whole-number multiple of the current-regulator clock cycle.

14. The non-transitory computer readable medium as claimed in claim 13, wherein the execution of the machine code by the control device causes the control device to communicate with a supervisory control device via a further interface in a control clock cycle; and
   wherein the control clock cycle is longer than the communication clock cycle.

15. The non-transitory computer readable medium as claimed in claim 12, wherein the execution of the machine code by the control device causes the control device to have a temporary master-slave relationship with one control device of other control devices based on communication with this control device.

16. A control device for a section of a linear drive, comprising:
   a plurality of peer-to-peer interfaces having real-time capability; and
   wherein the control device is programmed to execute a computer program comprising machine code which is executable by a control device for a section of a linear drive, each section having a plurality of subsections, execution of the machine code by the control device causing the control device to specify new desired values to each respective converter of a plurality of converters controlled by the control device, to control the plurality of converters respectively arranged externally at an output of a respective control device and applying current individually to the plurality of subsections of the respective section and collectively to the respective section, and to communicate with a number of other control devices via the plurality of peer-to-peer interfaces having real-time capability.

17. The control device as claimed in claim 16, wherein the control device and converters controlled by the control device are combined to form a group of modules disposed in immediate proximity.

18. The control device as claimed in claim 16, wherein the peer-to-peer interfaces operate based on Ethernet physics.

19. The control device as claimed in claim 17, wherein the peer-to-peer interfaces operate based on Ethernet physics.

20. A linear drive, comprising:
   a plurality of control devices including a plurality of peer-to-peer interfaces having real-time capability and being programmed by a computer program comprising machine code;
   a plurality of sequentially consecutive sections each controlled by a respective control device of the plurality of control devices assigned to a respective section of the plurality of sequentially consecutive sections; and
   a plurality of convertors, each of said plurality of convertors being respectively arranged externally at an output of the respective control device controlled by the respective control device and individually applying current to a subsection within a plurality of subsections of that section of the linear drive which is assigned to the respective control device, and collectively applying current to the respective section;
   wherein each of the control devices is connected via their peer-to-peer interfaces to a plurality of other control devices which control sections.

21. The linear drive as claimed in claim 20, wherein execution of the machine code by the control device causes the control device to have a temporary master-slave relationship with one control device of other control devices based on communication with this control device;
   wherein the master-slave relationship is established when an element, which is transported via the linear drive, is transported from one section of two sections that are immediately adjacent to each other to another section of the two sections that are immediately adjacent to each other; and
   wherein the master-slave relationship is maintained until the transported element has been transported from the one section of the two sections that are immediately adjacent to each other to other section of the two sections that are immediately adjacent to each other.

22. The linear drive as claimed in claim 21, wherein the control device from whose section the transported element is transported into the immediately adjacent section declares itself as the master of the control device for that section into which the transported element is transported.

23. The linear drive as claimed in claim 20, wherein the transported element is configured as a work carrier for transporting and positioning workpieces.

* * * * *